US008856460B2

(12) United States Patent
Bihani et al.

(10) Patent No.: US 8,856,460 B2
(45) Date of Patent: Oct. 7, 2014

(54) SYSTEM AND METHOD FOR ZERO BUFFER COPYING IN A MIDDLEWARE ENVIRONMENT

(75) Inventors: Ballav Bihani, Fremont, CA (US); Staffan Larsen, Stockholm (SE); Steven Liu, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 116 days.

(21) Appl. No.: 13/109,849

(22) Filed: May 17, 2011

(65) Prior Publication Data

US 2012/0066459 A1    Mar. 15, 2012

Related U.S. Application Data

(60) Provisional application No. 61/383,285, filed on Sep. 15, 2010, provisional application No. 61/384,227, filed on Sep. 17, 2010.

(51) Int. Cl.
*G06F 12/00*    (2006.01)
*G06F 17/30*    (2006.01)

(52) U.S. Cl.
CPC .... *G06F 17/30286* (2013.01); *G06F 17/30368* (2013.01); *G06F 17/30584* (2013.01)
USPC .......................................... 711/152; 711/103

(58) Field of Classification Search
CPC ..... G06F 9/30; G06F 9/3879; G06F 9/45504; G06F 9/45589; G06F 12/00
USPC ..................... 714/31; 705/1, 26; 711/103, 152
See application file for complete search history.

(56) References Cited

U.S. PATENT DOCUMENTS

| 5,109,384 | A  | 4/1992 | Tseung |
| 5,333,274 | A  | 7/1994 | Amini |
| 6,427,161 | B1 | 7/2002 | LiVecchi |
| 6,895,590 | B2 | 5/2005 | Yadav |
| 6,938,085 | B1 | 8/2005 | Belkin et al. |

(Continued)

FOREIGN PATENT DOCUMENTS

GB    2492653    1/2013

OTHER PUBLICATIONS

Richard G. Baldwin, "The ByteBuffer Class in Java", Aug. 20, 2002, developer.com.*

(Continued)

*Primary Examiner* — Aimee Li
*Assistant Examiner* — Christopher Do
(74) *Attorney, Agent, or Firm* — Meyer IP Law Group (57) ABSTRACT

Systems and methods are provided for zero buffer copying, where such a system includes one or more high performance computing systems, each including one or more processors and a high performance memory. The system further includes a user space that includes a Java virtual machine (JVM) and one or more application server instances; and a plurality of byte buffers accesible to the JVM and the one or more application server instances. When a request is received by a first application server instance data associated with the request is stored in a heap space associated with the JVM, and the JVM pins the portion of the heap space where the data is stored. The data is pushed to a first byte buffer where it is accessed by the first application server instance. A response is generated by the first application server using the data, and sent by the first application server.

18 Claims, 4 Drawing Sheets

(56) References Cited

U.S. PATENT DOCUMENTS

| | | |
|---|---|---|
| 7,394,288 B1 | 7/2008 | Agarwal |
| 7,554,993 B2 * | 6/2009 | Modi et al. .................. 370/401 |
| 7,831,731 B2 | 11/2010 | Tang |
| 7,991,904 B2 | 8/2011 | Melnyk et al. |
| 8,130,776 B1 | 3/2012 | Sundararajan |
| 8,131,860 B1 | 3/2012 | Wong et al. |
| 8,578,033 B2 | 11/2013 | Mallart |
| 8,601,057 B2 | 12/2013 | Han |
| 2002/0174136 A1 | 11/2002 | Cameron et al. |
| 2003/0014480 A1 | 1/2003 | Pullara et al. |
| 2003/0078958 A1 | 4/2003 | Pace et al. |
| 2003/0110232 A1 | 6/2003 | Chen |
| 2003/0120822 A1 | 6/2003 | Langrind et al. |
| 2004/0122953 A1 | 6/2004 | Kalmuk |
| 2004/0177126 A1 | 9/2004 | Maine |
| 2004/0205771 A1 | 10/2004 | Sudarshan et al. |
| 2005/0021354 A1 | 1/2005 | Brendle et al. |
| 2005/0027901 A1 | 2/2005 | Simon |
| 2005/0038801 A1 | 2/2005 | Colrain et al. |
| 2005/0094577 A1 | 5/2005 | Ashwood-Smith |
| 2005/0102412 A1 | 5/2005 | Hirsimaki |
| 2005/0223109 A1 | 10/2005 | Mamou |
| 2005/0262215 A1 | 11/2005 | Kirov et al. |
| 2006/0015600 A1 | 1/2006 | Piper |
| 2006/0031846 A1 | 2/2006 | Jacobs et al. |
| 2006/0143525 A1 * | 6/2006 | Kilian .......................... 714/31 |
| 2006/0176884 A1 | 8/2006 | Fair |
| 2006/0209899 A1 | 9/2006 | Cucchi et al. |
| 2006/0294417 A1 | 12/2006 | Awasthi et al. |
| 2007/0156869 A1 | 7/2007 | Galchev |
| 2007/0198684 A1 | 8/2007 | Mizushima |
| 2007/0203944 A1 | 8/2007 | Batra et al. |
| 2007/0245005 A1 | 10/2007 | Banerjee |
| 2008/0044141 A1 | 2/2008 | Willis et al. |
| 2008/0098458 A2 | 4/2008 | Smith |
| 2008/0140844 A1 | 6/2008 | Halpern |
| 2008/0195664 A1 | 8/2008 | Maharajh |
| 2008/0286741 A1 | 11/2008 | Call |
| 2009/0024764 A1 | 1/2009 | Atherton |
| 2009/0034537 A1 | 2/2009 | Colrain et al. |
| 2009/0150647 A1 | 6/2009 | Mejdrich et al. |
| 2009/0172636 A1 | 7/2009 | Griffith |
| 2009/0182642 A1 * | 7/2009 | Sundaresan .................. 705/26 |
| 2009/0327471 A1 | 12/2009 | Astete et al. |
| 2010/0138531 A1 | 6/2010 | Kashyap |
| 2010/0198920 A1 | 8/2010 | Wong |
| 2010/0199259 A1 | 8/2010 | Quinn et al. |
| 2011/0029812 A1 | 2/2011 | Lu et al. |
| 2011/0055510 A1 | 3/2011 | Fritz et al. |
| 2011/0066737 A1 | 3/2011 | Mallart |
| 2011/0071981 A1 | 3/2011 | Ghosh et al. |
| 2011/0119673 A1 | 5/2011 | Bloch |
| 2011/0161457 A1 | 6/2011 | Sentinelli |
| 2011/0185021 A1 | 7/2011 | Han |
| 2012/0023557 A1 | 1/2012 | Bevan |
| 2012/0066400 A1 | 3/2012 | Reynolds |
| 2012/0066460 A1 | 3/2012 | Bihani |
| 2012/0131330 A1 | 5/2012 | Tonsing |
| 2012/0144045 A1 | 6/2012 | Revanuru |
| 2012/0218891 A1 | 8/2012 | Sundararajan |
| 2012/0239730 A1 | 9/2012 | Revanuru |
| 2013/0004002 A1 | 1/2013 | Duchscher |
| 2013/0014118 A1 | 1/2013 | Jones |
| 2014/0059226 A1 | 2/2014 | Messerli |

OTHER PUBLICATIONS

International Search Report and Written Opinion dated Dec. 6, 2011, PCT/US2011/051697, 11 pages.

International Search Report and Written Opinion dated Dec. 6, 2011, PCT/US2011/051459, 9 pages.

International Searching Authority at the European Patent Office, International Search Report and Written Opinion for PCT International Patent Application PCT/US2013/067286, Feb. 5, 2014, 10 pages.

Pfister, An introduction to the InfiniBand Architecture, 2002, pp. 617-632.

Anonymous, What is Scatter-Gather DMA (Direct Memory Access)?, Jul. 22, 2010, 2 pages.

* cited by examiner

SYSTEM AND METHOD FOR ZERO BUFFER COPYING IN A MIDDLEWARE ENVIRONMENT

CLAIM OF PRIORITY

This application claims the benefit of priority to U.S. Provisional Patent Application titled "MIDDLEWARE MACHINE PLATFORM", Application No. 61/383,285, filed Sep. 15, 2010; and U.S. Provisional Patent Application titled "MIDDLEWARE MACHINE PLATFORM", Application No. 61/384,227, filed Sep. 17, 2010, each of which applications are herein incorporated by reference.

CROSS REFERENCE TO RELATED APPLICATIONS

This application is related to U.S. patent application Ser. No. 13/170,490, filed on Jun. 28, 2011, entitled "SYSTEM AND METHOD FOR PROVIDING SCATTER/GATHER DATA PROCESSING IN A MIDDLEWARE ENVIRONMENT"; U.S. patent application Ser. No. 13/109,871, filed on May 17, 2011, which is now U.S. Pat. No. 8,756,329, issued on Jun. 17, 2014, entitled "SYSTEM AND METHOD FOR PARALLEL MULTIPLEXING BETWEEN SERVERS IN A CLUSTER"; and U.S. patent application Ser. No. 13/167,636, filed on Jun. 23, 2011, entitled "SYSTEM AND METHOD FOR SUPPORTING LAZY DESERIALIZATION OF SESSION INFORMATION IN A SERVER CLUSTER", each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to systems and methods for zero buffer copying in a middleware environment.

BACKGROUND

Within any large organization, over the span of many years the organization often finds itself with a sprawling IT infrastructure that encompasses a variety of different computer hardware, operating-systems, and application software. Although each individual component of such infrastructure might itself be well-engineered and well-maintained, when attempts are made to interconnect such components, or to share common resources, it is often a difficult administration task. In recent years, organizations have turned their attention to technologies such as virtualization and centralized storage, and even more recently cloud computing, which can provide the basis for a shared infrastructure. However, there are few all-in-one platforms that are particularly suited for use in such environments. These are the general areas that embodiments of the invention are intended to address.

SUMMARY

Systems and methods are provided for zero buffer copying in a middleware environment. In accordance with an embodiment, such a system can include one or more high performance computing systems, each including one or more processors and a high performance memory. The system can further include a user space, which includes a Java virtual machine (JVM) and one or more application server instances. Additionally, the system can include a plurality of byte buffers accessible to the JVM and the one or more application server instances. When a request is received by a first application server instance data associated with the request is stored in a heap space associated with the JVM, and the JVM pins the portion of the heap space where the data is stored. The data is pushed to a first byte buffer where it is accessed by the first application server instance. A response is generated by the first application server using the data, and the response is sent by the first application server.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

As described above, in recent years, organizations have turned their attention to technologies such as virtualization and centralized storage, and even more recently cloud computing, which can provide the basis for a shared infrastructure. However, there are few all-in-one platforms that are particularly suited for use in such environments. Described herein is a system and method for providing a middleware machine or similar platform (referred to herein in some implementations as "Exalogic"), which comprises a combination of high performance hardware, together with an application server or middleware environment, and additional features, to provide a complete Java EE application server complex which includes a massively parallel in-memory grid, can be provisioned quickly, and can scale on demand.

In particular, as described herein, systems and methods are provided for zero buffer copying in a middleware environment. In accordance with an embodiment, such a system can include one or more high performance computing systems, each including one or more processors and a high performance memory. The system can further include a user space, which includes a Java virtual machine (JVM) and one or more application server instances. Additionally, the system can include a plurality of byte buffers accessible to the JVM and the one or more application server instances. When a request is received by a first application server instance, data associated with the request is stored in a heap space associated with the JVM, and the JVM pins the portion of the heap space where the data is stored. The data is pushed to a first byte buffer where it is accessed by the first application server instance. A response is generated by the first application server using the data, and the response is sent by the first application server.

In accordance with an embodiment, the system can use zero buffer copying, which avoids buffer copies in components such as WebLogic Server (WLS), JRockit or Hotspot JVM, Oracle Linux or Solaris, and the operating system (OS). Traditionally, each layer (e.g., the server layer, the JVM layer, the OS layer, etc) of a system keeps a private memory space that other layers, applications and processes cannot access. This is to protect the overall stability of the system by preventing foreign systems from corrupting key memory spaces and data and contributing to a system crash. As such, during request and response processing, data related to the request and response are copied between layers, from private memory space to private memory space. That is, after a given layer has processed the data, it pushes it to the next layer which then copies the data in to its private memory space, operates on it and pushes it to the next layer, etc. However, embodiments of the present invention provide tight integration between the various layers, enabling them to share memory spaces safely, without increasing risk to system stability. As such this reduces CPU utilization in the User & Kernel space, and as such reduces latency.

Figure 1:
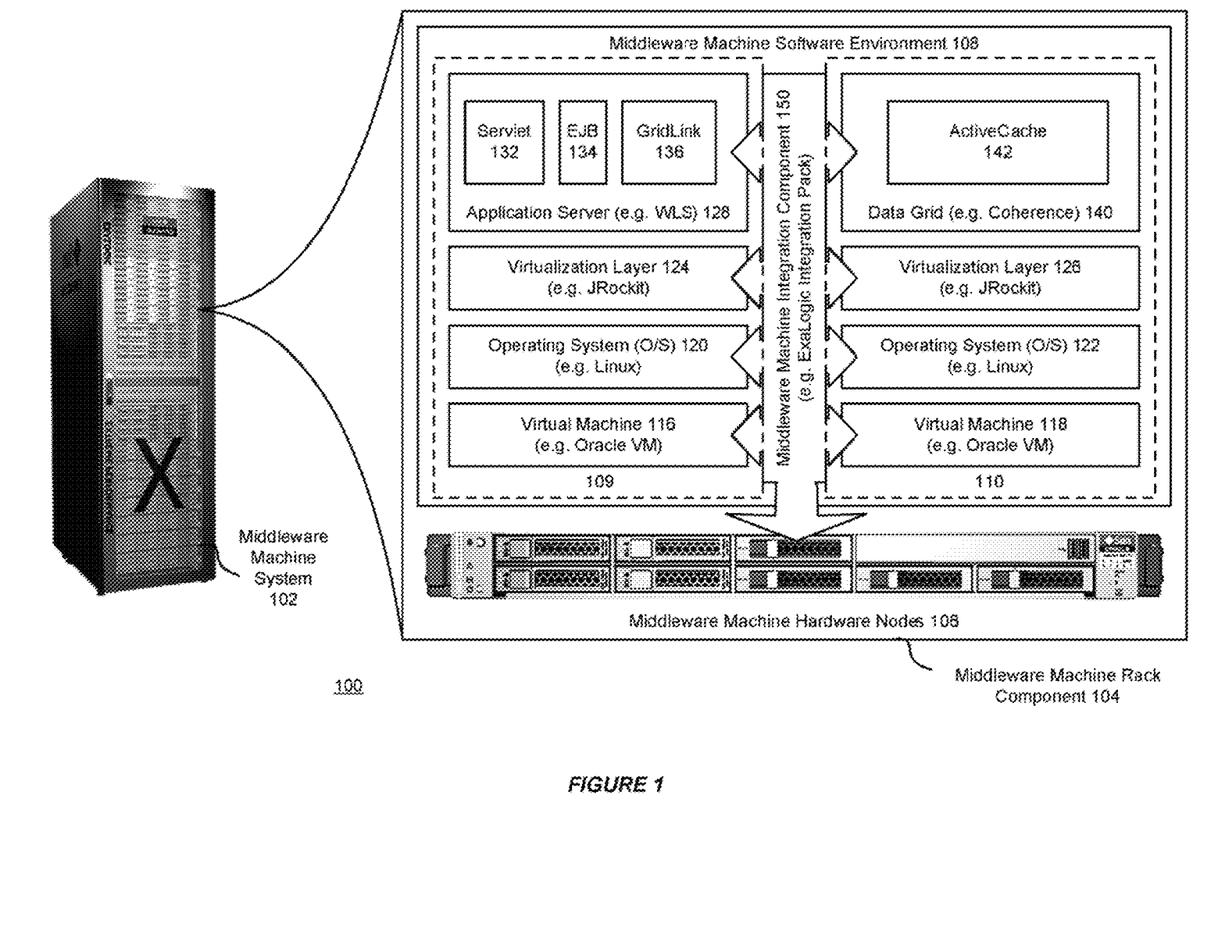
FIG. 1 shows an illustration of a middleware machine environment, in accordance with an embodiment.

FIG. 1 shows an illustration of a middleware machine environment 100, in accordance with an embodiment. As shown in FIG. 1, each middleware machine system 102 includes several middleware machine rack components 104, each of which includes a combination of high-performance middleware machine hardware nodes 106 (e.g., 64-bit processors, high performance large memory, and redundant InfiniBand and Ethernet networking), and a middleware machine software environment 108. The result is a complete application server environment which can be provisioned in minutes rather than days or months, and which can scale on demand. In accordance with an embodiment, each middleware machine system can be deployed as a full, half, or quarter rack, or other configuration of rack components, and several middleware machine systems can be coupled together, again using InfiniBand, to create larger environments. Each middleware machine software environment can be provisioned with several application server or other software instances, for example as shown in FIG. 1, an application server instance 109 could comprise a virtual machine 116, operating system 120, virtualization layer 124, and application server layer 128 (e.g. WebLogic, including servlet 132, EJB 134, and Gridlink 136 containers); while another application server instance 110 could comprise a virtual machine 118, operating system 122, virtualization layer 126, and data grid layer 140 (e.g. Coherence, including an active cache 142). Each of the instances can communicate with one another, and with both its middleware machine hardware node, and other nodes, using a middleware machine integration component 150, such as an ExaLogic integration pack, which itself provides several optimization features, such as support for InfiniBand and other features, as described in further detail below.

Figure 2:
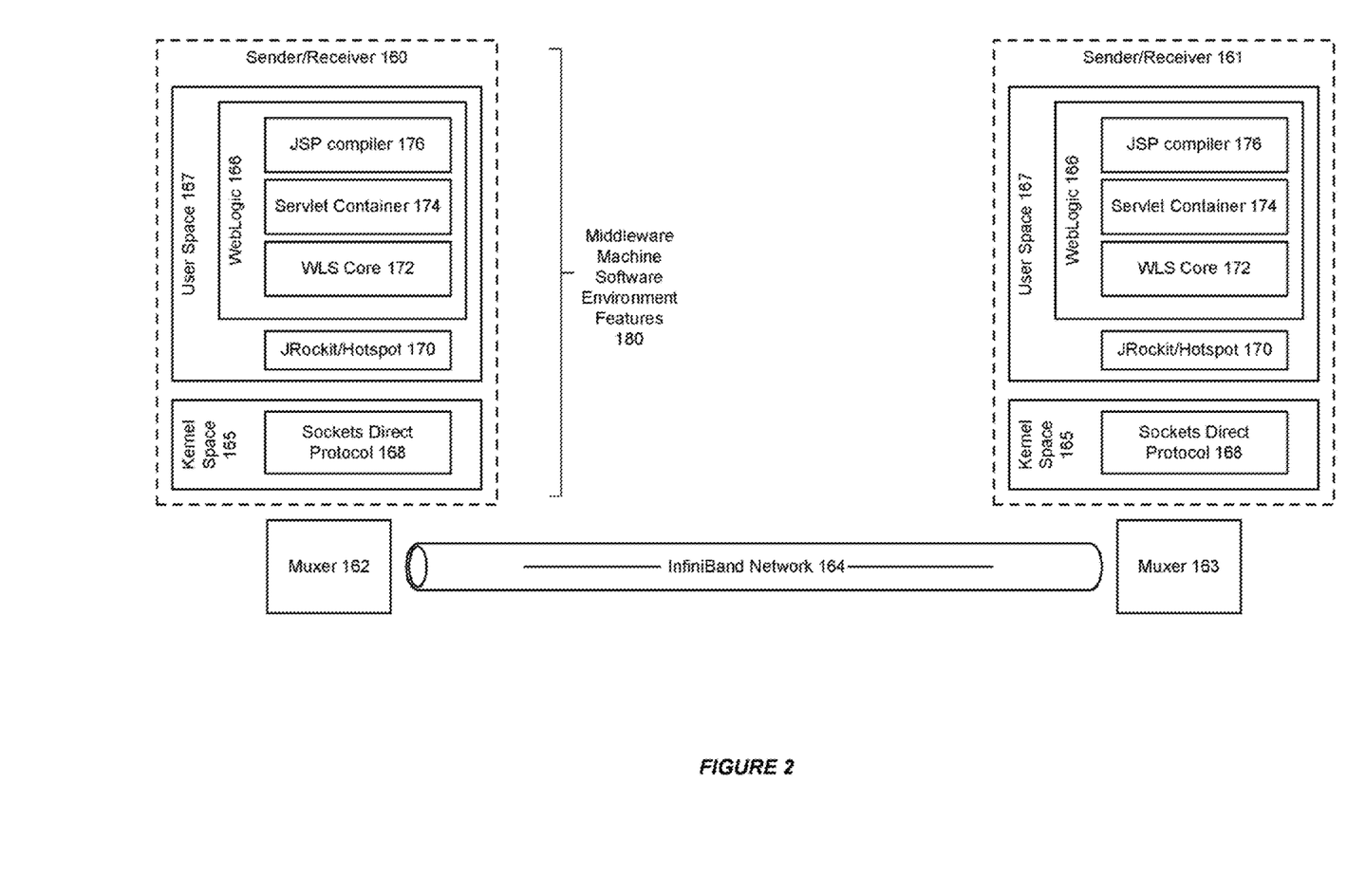
FIG. 2 shows another illustration of a middleware machine platform or environment, in accordance with an embodiment.

FIG. 2 shows another illustration of a middleware machine platform or environment 180, in accordance with an embodiment. As shown in FIG. 2, each application server instance can act as a sender and/or receiver 160, 161 within the middleware machine environment. Each application server instance is also associated with a muxer 162, 163, that allows application servers to communicate with one another via an InfiniBand network 164. In the example shown in FIG. 2, an application server instance can include a kernel space 165, user space 167, and application server (e.g. WebLogic space) 166, which in turn can include a sockets direct protocol 168, JVM (e.g. JRockit/Hotspot layer) 170, WLS core 172, servlet container 174, and JSP compiler 176. In accordance with other examples, other combinations of middleware-type software can be included. In accordance with various embodiments, the machine integration component can provide features such as Zero Buffer Copies, Scatter/Gather I/O, T3 Connections, Lazy Deserialization, and GridLink DataSource, to provide the basis for, and improve performance within, the shared infrastructure.

Zero Buffer Copying

Figure 3:
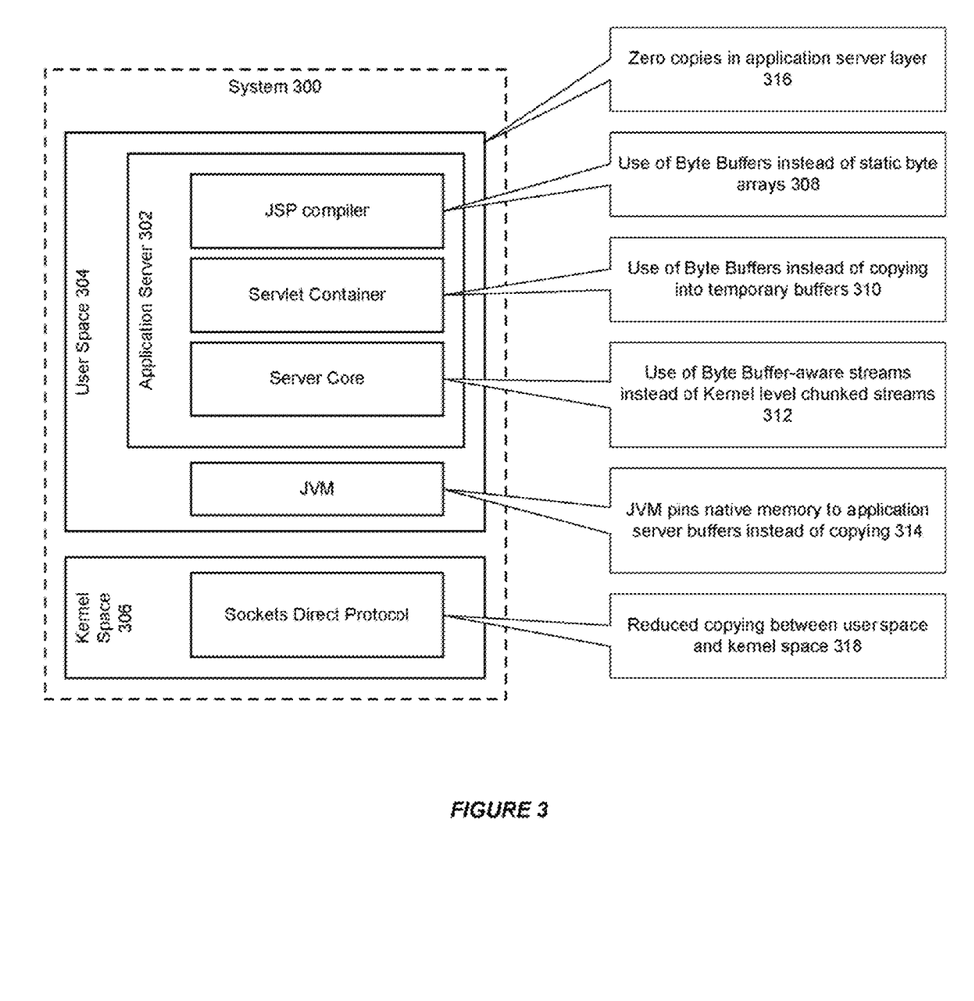
FIG. 3 shows a system for providing zero buffer copying, in accordance with an embodiment.

FIG. 3 shows a system 300 for providing zero buffer copying, in accordance with an embodiment. As shown in FIG. 3, a number of different features can be provided in each of the Application Server 302, User Space 304, and Kernel Space 306. At the server level, byte buffers can be used instead of static byte arrays and temporary buffers. For example, the JSP compiler can use byte buffers 308 instead of static byte arrays. A byte buffer can be created by wrapping a backing byte array. Changes made to either the byte buffer or the backing byte array are reflected in the other. Thus, rather than creating a new byte array for each layer to operate on and then copying that byte array into a new byte array for the next layer, one byte array can be stored and a byte buffer wrapped around that byte array. As each layer operates on the byte array, the changes are applied to the byte array. This limits the amount of copying required, and improves performance. Similarly, the servlet container can use 310 the byte buffers instead of copying into temporary buffers, and the server core can use 312 byte buffer-aware streams instead of Kernel level chunked streams, and enabling the JVM to pin native memory to WLS buffers instead of copying 314. By pinning the memory, the JVM ensures that that memory is not garbage collected or used by any other process. Thus, at each step in the processing of the data, a pointer or reference to the data in memory can be used, instead of copying the data at each step. These improvements allow for zero copying at the server layer 316, saving CPU cycles and improving performance.

In accordance with an embodiment, the platform also supports use 318 of Socket Direct Protocol (SDP) that avoids copying of the byte buffer data from the JVM running in user space to the network stack in the kernel space. This further reduces the number of buffer copies while serving HTTP requests. Avoiding copying saves CPU cycles both in the user and the kernel space which reduces latencies for HTTP traffic.

In an exemplary embodiment, the application server (e.g. WebLogic Server) can be modified to achieve zero buffer copies while serving HTTP requests. A WebLogic Server JSP Compiler can write static JSP content directly into Java New I/O (NIO) byte buffers. At runtime, a web container can pass these byte buffers directly to byte buffer-aware WebLogic Server 10 Streams without any copying. These byte buffers can be then directly written out by the NIO Muxer using gathered writes. A JVM (e.g. JRockit or HotSpot JVM) running on Exalogic can pin these byte buffers in memory and avoid making a copy of the data to the native memory.

Figure 4:
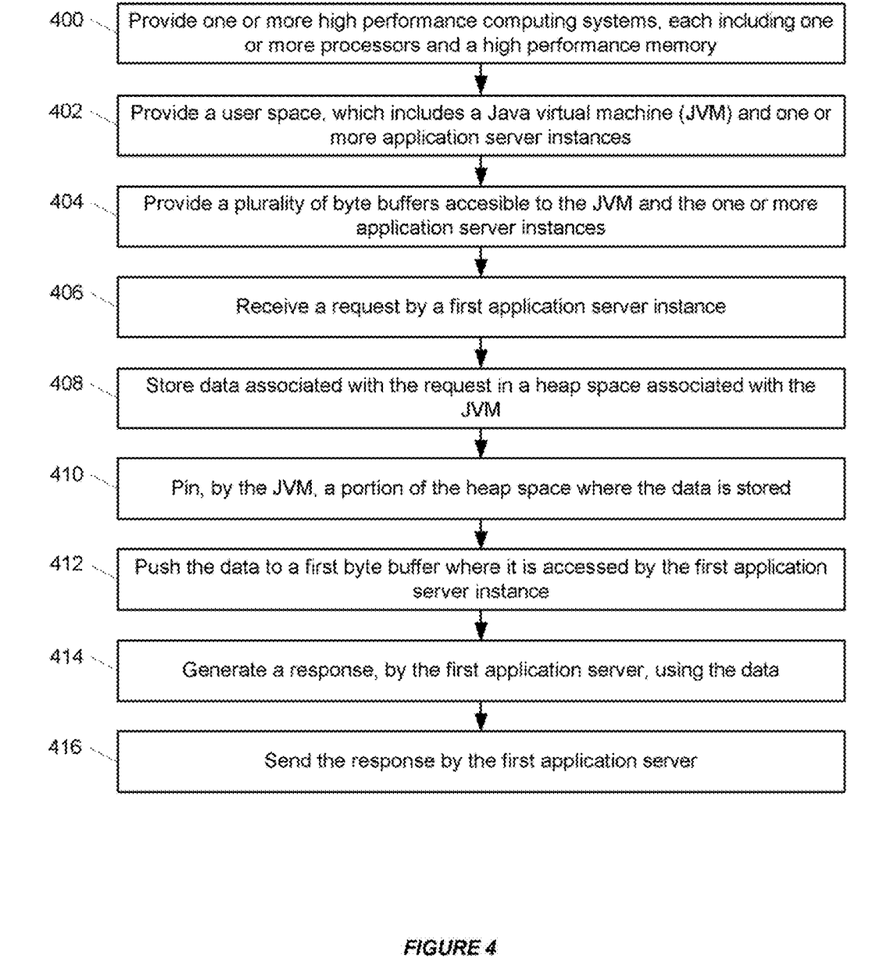
FIG. 4 shows a flowchart of a method for zero buffer copying, in accordance with an embodiment.

FIG. 4 shows a flowchart of a method for zero buffer copying, in accordance with an embodiment. At step 400, one or more high performance computing systems, each including one or more processors and a high performance memory, is provided. At step 402, a user space, which includes a Java virtual machine (JVM) and one or more application server instances, is provided. At step 404, a plurality of byte buffers accessible to the JVM and the one or more application server instances, are provided. At step 406 a request is received by a first application server instance. At step 408, data associated with the request is stored in a heap space associated with the JVM. At step 410, the JVM pins a portion of the heap space where the data is stored. At step 412, the data is pushed to a first byte buffer where it is accessed by the first application server instance. At step 414, a response is generated by the first application server, using the data. At step 416, the response is sent by the first application server.

In accordance with an embodiment, the method shown in FIG. 4 can further include the steps of providing a kernel space which includes support for sockets direct protocol (SDP); and providing one or more byte buffer-aware streams accessible to the kernel space and the user space. Additionally, in the method shown in FIG. 4, each byte buffer can be a Java New I/O (NIO) byte buffer. Furthermore, the request can be an HTTP request. Also, in the method shown in FIG. 4, the first byte buffer can include a reference pointing to where the data is stored in the heap space.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for zero buffer copying, comprising:
one or more high performance computing systems, each including one or more processors and a high performance memory;
a user space on each of the one or more high performance computing systems, wherein the user space includes a Java virtual machine (JVM) and one or more application server instances, wherein each of said application server instances includes a muxer and a plurality of layers to process a request;
a plurality of byte buffers accessible to the JVM and said application server instances;
wherein when the request is received by a said application server instance
data from the request is stored on a heap space, and pushed from the heap space to a byte buffer,
wherein the byte buffer is pinned to native memory by the JVM, such that the byte buffer is prevented from being copied from a processing layer to a processing layer, and instead a same copy of the byte buffer is passed through each of the plurality of processing layers,
wherein each processing layer operates on the data in the byte buffer to participate in generating a response to the original request that supplies the data in the byte buffer,
and the response is sent out by the muxer.

2. The system of claim 1, further comprising:
a kernel space which includes support for sockets direct protocol; and
one or more byte buffer-aware streams accessible to the kernel space and the user space.

3. The system of claim 1, wherein each of the plurality of byte buffers is a Java New I/O (NIO) byte buffer.

4. The system of claim 1, wherein the request is an HTTP request.

5. The system of claim 1, wherein the portion of the heap space where the data is stored is pinned from being garbage collected.

6. The system of claim 1, wherein the plurality of processing layer include Java Server Page compiler, a servlet container, and an application server core.

7. A method for zero buffer copying, comprising:
providing one or more high performance computing systems, each including one or more processors and a high performance memory;
providing a user space on each of the one or more high performance computer systems, wherein the user space includes a Java virtual machine (JVM) and one or more application server instances, wherein each of said application server instances includes a muxer and a plurality of layers to process a request;
providing a plurality of byte buffers accessible to the JVM and the one or more application server instances;
receiving the request by a said application server instance;
storing data from the request on a heap space;
writing the data from the heap space to a byte buffer,
wherein the byte buffer is pinned to native memory by the JVM, such that the byte buffer is prevented from being copied from a processing layer to a processing layer, and instead a same copy of the byte buffer is passed through each of the plurality of processing layers, wherein each processing laye operates on the data in the byte buffer to participate in generating a response to the original request that supplies the data in the byte buffer;

and sending the response by the muxer in said application server instance.

8. The method of claim 7 further comprising:

providing a kernel space which includes support for sockets direct protocol; and providing one or more byte buffer-aware streams accessible to the kernel space and the user space.

9. The method of claim 7, wherein each of the byte buffers is a Java New I/O (NIO) byte buffer.

10. The method of claim 7 wherein the request is an HTTP request.

11. The method of claim 7, wherein the portion of the heap space where the data is stored is pinned from being garbage collected.

12. The method of claim 7, wherein the plurality of processing layer include Java Server Page compiler, a servlet container, and an application server core.

13. A non-transitory computer readable storage medium storing one or more sequences of instructions for zero buffer copying, wherein said instructions, when executed by one or more processors, cause the one or more processors to execute the steps comprising:

providing a user space on each of the one or more high performance computer systems, wherein the user space includes a Java virtual machine (JVM) and one or more application server instances, wherein each of said application server instances includes a muxer and a plurality of layers to process a request;

providing a plurality of byte buffers accessible to the JVM and the one or more application server instances;

receiving the request by a said application server instance;

storing data from the request on a heap space;

writing the data from the heap space to a byte buffer, wherein the byte buffer is pinned to native memory by the JVM, such that the byte buffer is prevented from being copied from a processing layer to a processing layer, and instead a same copy of the byte buffer is passed through each of the plurality of processing layers, wherein each processing laye operates on the data in the byte buffer to participate in generating a response to the original request that supplies the data in the byte buffer;

and sending the response by the muxer in said application server instance.

14. The non-transitory computer readable storage medium of claim 13, further comprising:

providing a kernel space which includes support for sockets direct protocol; and providing one or more byte buffer-aware streams accessible to the kernel space and the user space.

15. The non-transitory computer readable storage medium of claim 13, wherein each of the byte buffers is a Java New I/O (NIO) byte buffer.

16. The non-transitory computer readable storage medium of claim 13, wherein the request is an HTTP request.

17. The non-transitory computer readable storage medium of claim 13, wherein the portion of the heap space where the data is stored is pinned from being garbage collected.

18. The non-transitory computer readable storage medium of claim 13, wherein the plurality of processing layer include Java Server Page compiler, a servlet container, and an application server core.

* * * * *

UNITED STATES PATENT AND TRADEMARK OFFICE
CERTIFICATE OF CORRECTION

PATENT NO. : 8,856,460 B2  
APPLICATION NO. : 13/109849  
DATED : October 7, 2014  
INVENTOR(S) : Bihani et al.

It is certified that error appears in the above-identified patent and that said Letters Patent is hereby corrected as shown below:

On Title page, column 2, under Abstract, line 7, delete "accesible" and insert -- accessible --, therefor.

In The Drawings

Sheet 4 of 4, in figure 4, under Reference Numeral 404, line 1, delete "accesible" and insert -- accessible --, therefor.

In The Specification

In column 4, line 46, delete "that that" and insert -- that --, therefor.

In The Claims

In column 7, line 1, in Claim 7, delete "laye" and insert -- layer --, therefor.

In column 8, line 10, in Claim 13, delete "laye" and insert -- layer --, therefor.

Signed and Sealed this  
Fifth Day of May, 2015

Michelle K. Lee  
*Director of the United States Patent and Trademark Office*